(12) United States Patent
Douglas et al.

(10) Patent No.: US 7,221,441 B2
(45) Date of Patent: May 22, 2007

(54) METHOD FOR MEASURING OPTICALLY REFLECTIVE VEHICLE WHEEL SURFACES

(75) Inventors: Michael W. Douglas, St. Charles, MO (US); Thomas Golab, St. Peters, MO (US)

(73) Assignee: Hunter Engineering Company, Bridgeton, MO (US)

( * ) Notice: Subject to any disclaimer, the term of this patent is extended or adjusted under 35 U.S.C. 154(b) by 468 days.

(21) Appl. No.: 10/912,846

(22) Filed: Aug. 6, 2004

(65) Prior Publication Data

US 2006/0028638 A1 Feb. 9, 2006

(51) Int. Cl.
*G01B 11/275* (2006.01)
(52) U.S. Cl. .................. 356/139.09; 301/5.21
(58) Field of Classification Search ........... 356/139.09, 356/155; 73/460–462; 33/203.18; 301/5.21
See application file for complete search history.

(56) References Cited

U.S. PATENT DOCUMENTS

| | | | |
|---|---|---|---|
| 4,480,471 A | 11/1984 | Kogler et al. | |
| 5,054,918 A | 10/1991 | Downing et al. | |
| 5,827,964 A | 10/1998 | Douine et al. | |
| 6,122,957 A | 9/2000 | Bux et al. | |
| 6,244,108 B1 | 6/2001 | McInnes et al. | |
| 6,484,574 B1 | 11/2002 | Douglas et al. | |
| 6,535,281 B2 | 3/2003 | Conheady et al. | |
| 7,140,949 B2 * | 11/2006 | Gatton et al. | .................. 451/41 |
| 2004/0050159 A1 | 3/2004 | Corghi | |
| 2004/0051864 A1 | 3/2004 | Braghiroli | |
| 2005/0062332 A1* | 3/2005 | Amyot et al. | ............... 301/5.21 |
| 2005/0089646 A1* | 4/2005 | Endicott et al. | ............ 427/446 |
| 2005/0229702 A1* | 10/2005 | Haydu | ........................ 73/468 |

* cited by examiner

*Primary Examiner*—Thomas H. Tarcza
*Assistant Examiner*—Isam Alsomiri
(74) *Attorney, Agent, or Firm*—Polster, Lieder, Woodruff & Lucchesi, L. C.

(57) ABSTRACT

A method for the operation of a vehicle wheel service system configured to illuminate a surface of a vehicle wheel rim and tire assembly. The method includes the steps of mounting a vehicle wheel rim and tire assembly onto the vehicle wheel service system, coating a surface of the vehicle wheel rim and tire assembly with a medium to alter the optical characteristics of the vehicle wheel rim and tire assembly surface, and illuminating the optically altered surface of the vehicle wheel rim and tire assembly.

38 Claims, 5 Drawing Sheets

METHOD FOR MEASURING OPTICALLY REFLECTIVE VEHICLE WHEEL SURFACES

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates to vehicle wheel service systems, and in particular, to a method of operation for vehicle wheel service systems such as wheel balancers and tire changers configured to illuminate a surface of a wheel rim and tire assembly with a light source or laser, such as to project a display of information onto a surface of vehicle wheel rim or, to optically acquire one or more measurements from a feature on the illuminated surface, to facilitate completion of a wheel imbalance measurement or correction procedure.

When performing vehicle wheel service procedures, such as the mounting of a tire onto a vehicle wheel rim, or the balancing of a wheel rim and tire assembly, it is known to utilize non-contact methods to acquire measurements associated with the vehicle wheel rim and tire assembly, or to display information to an operator directly on a surface of the vehicle wheel rim and tire assembly. Optically-based non-contact methods commonly utilize a laser or other visible light source to project a visible feature onto a surface of the vehicle wheel rim and tire assembly, which is either observed by an operator or imaged by an optical sensor to assist in the completion of a vehicle wheel service procedure For example, in a vehicle wheel balancer application, during the balancing a vehicle wheel rim and tire assembly, several potential sources for operator error exist which can be alleviated with the use of visible features projected onto the surface of a wheel rim and tire assembly. First, there is a need to identify the proper correction planes on the wheel rim at which imbalance correction weights are to be placed. Second, the wheel rim and tire assembly must be correctly rotated to, and held in, a rotational position such that the operator can place an imbalance correction weight in the identified correction plane, and third, the operator must manually apply the imbalance correction weight to the wheel rim in the identified correction plane and at the proper rotational position.

The determination of unbalance in vehicle wheel rim and tire assemblies is generally carried out by an analysis of the phase and amplitude of the mechanical vibrations caused by the rotating unbalanced mass of the wheel rim and tire assembly. The mechanical vibrations are measured as motions, forces, or pressures by means of transducers, which convert the mechanical vibrations to electrical signals. The electrical signals are subsequently analyzed by a suitably programmed microprocessor. Each electrical signal is representative of a combination of fundamental oscillations caused by the rotating imbalance mass and noise.

It is well known in the art that a variety of types of imbalance correction weights are available for placing on a wheel rim to correct a measured imbalance. For example, adhesive-backed weights, patch balance weights, and hammer-on weights are available from a number of different manufacturers. Most wheel balancer systems are configured to assume that the wheel rim and tire assembly will be rotated to a particular rotational position (for example, disposing the desired weight correction position at the top—twelve o'clock—or bottom—six o'clock—rotational positions) during placement of an imbalance correction weight. This is generally not a problem, unless it is more convenient to apply the weight with the wheel rim and tire assembly in a different rotational position, for example, the four or five o'clock rotational positions, when the operator is standing facing the surface of the wheel rim and tire assembly mounted on the wheel balancer system.

To compensate for a combination of static imbalance (where the heaviest part of the wheel rim and tire assembly will naturally tend towards a rotational position directly below the mounting shaft) and couple imbalance (where the rotating wheel rim and tire assembly exerts torsional vibrations on the mounting shaft), at least two correction weights are typically required to be separated axially along the wheel rim surface, coincident with weight location or imbalance correction "planes". For imbalance correction weights of the "clip-on" style, the "left plane" comprises the left (innermost) rim lip circumference while the "right plane" comprises the right rim lip. If imbalance correction weights of the "adhesive" style are used, the imbalance correction planes can reside anywhere between the rim lips, barring physical obstruction such as wheel spokes, valve stems, welds, or regions of excessive wheel rim curvature.

During a wheel balancing procedure, the wheel rim and tire assembly is initially mounted to the wheel balancer system, and a scan of the wheel rim inner surface profiles is optionally acquired, either with a mechanical contact system, such as is described in U.S. Pat. No. 6,484,574 B1 to Douglas et. al. or a non-contact measurement system, such as is described in U.S. Pat. No. 6,535,281 B2 to Conheady, et al.

Next, the imbalance correction planes are selected and the relative distances from a reference plane (usually the surface of the wheel mounting hub) to each of the imbalance correction planes is measured either by manual measurement with a pull-out gauge and the observed values provided to the microprocessor, or by using an automatic electronic measuring apparatus to electronically provide a direct measurement of the relative distance to the wheel balancer microprocessor. The radius of the wheel rim at which the weights will be placed must also be provided to the microprocessor, either manually, or by use of the electronic measuring apparatus.

The microprocessors employed by conventional vehicle wheel balancers are generally configured to utilize the input weight plane information, together with variable weight amounts and variable radial placements, to identify proper locations for placement of the imbalance correction weights on the wheel rim, and optionally, to control rotation of the wheel rim and tire assembly. While utilization of such a balancer system facilitates the placement of an imbalance correction weight by placing the vehicle wheel rim and tire assembly in a preferred, or optimal rotational position for placement of the imbalance correction weight, it does not reduce other sources of operator error, such as the placement of an imbalance weight in the incorrect balance plane, a poor selection of imbalance planes by the operator, or failure to compensate for the width of the installed imbalance weights.

Automatic positioning of the wheel rim and tire assembly to a predetermined imbalance correction weight placement rotational position can be enhanced with the addition of a visual guide to the operator. In a basic embodiment, the vehicle wheel balancer system is provided with a laser projection system under control of the microprocessor for projecting a laser dot or illuminated point of light onto a surface of the vehicle wheel rim and tire assembly at a location corresponding to an imbalance correction plane. The laser dot or point of light may be continuously projected onto the wheel rim and tire surface, or illuminated only when the wheel is rotated such that an imbalance correction weight rotational position is aligned with a predetermined rotational about the axis of the balance shaft, such as shown in U.S. Pat. No. 6,244,108 B1 to McInnes et al.

An improvement over selective illumination of the wheel rim and tire assembly surfaces is seen in U.S. Pat. No. 6,484,574 B1 to Douglas et al., which combines a continuous laser projection guide with a wheel balancer system including a direct current motor. A control circuit controls the application of direct current to the direct current motor and determines from vibrations measured by a vibration sensor assembly, at least one weight placement position on the wheel rim and tire assembly to correct the vibrations. The control circuit is responsive to determination of an imbalance correction weight plane to project a laser projection onto the surface of the wheel rim at the selected imbalance correction plane. The controller then rotates the wheel rim and tire assembly to bring the weight placement position to a predetermined rotational location coinciding with the laser projection in the imbalance correction weight plane, and to actively hold the wheel rim and tire assembly in that rotational location at which an imbalance correction weight is to be placed.

In addition to providing guidance to an operator during placement of an imbalance correction weight, the illuminated surface of the vehicle wheel rim and tire assembly may optionally be observed or imaged by a sensor operatively coupled to the vehicle wheel balancer microprocessor. Images of the illumined surface, including the laser dot or point, may be utilized to acquire one or more measurements associated with the vehicle wheel rim and tire assembly, such as shown in U.S. Pat. No. 6,535,281 B2 to Conheady et al.

Regardless of the manner of operation of a vehicle wheel service system configured to illuminate a surface of a vehicle wheel rim and tire assembly, the wide variation in the optical characteristics of vehicle wheel rim and tire assembly surfaces can render such systems non-functional. In particular, vehicle wheel rim and tire assemblies in which the vehicle wheel rim surface is finished in a highly reflective polish or coating, such as chrome, can result in highly limited angles of reflection, unpredictable reflections, or distortions in the illuminating light or laser rendering it difficult or impossible for the operator or an imaging sensor to identify an intended illuminated point, dot, image, or feature on the wheel rim surface.

Accordingly, it would be advantageous to provide a method of operation for vehicle wheel service systems configured to illuminate a surface of a vehicle wheel rim and tire assembly, either for purposes of operator guidance or to acquire one or more measurements of a vehicle wheel rim and tire characteristic, which alters the optical characteristics of the vehicle wheel rim and tire assembly surfaces to enable the surfaces to be illuminated and observed in a desired manner.

BRIEF SUMMARY OF THE INVENTION

Briefly stated, the present invention provides a method for the operation of a vehicle wheel service system configured to illuminate a surface of a vehicle wheel rim and tire assembly. The method includes the initial steps of mounting the vehicle wheel rim and tire assembly onto the vehicle wheel service system, and coating a surface of the vehicle wheel rim and tire assembly with a medium to alter the optical characteristics of the vehicle wheel rim and tire assembly surface. Subsequently, the vehicle wheel rim and tire assembly surface is illuminated to identify a feature on the surface of the vehicle wheel rim and tire assembly. Following observation of the identifiable feature or acquisition of required measurements, the medium may be removed from the surface of the vehicle wheel rim and tire assembly.

An alternate method of the present invention for the operation of a vehicle wheel service system configured to illuminate a surface of a vehicle wheel rim and tire assembly includes the steps of mounting a vehicle wheel rim and tire assembly onto the vehicle wheel service system, illuminating a surface of the vehicle wheel rim and tire assembly, and acquiring an image of the illuminated surface. The acquired image is analyzed, and responsive to the acquired image lacking a predetermined feature or characteristic, the surface of the vehicle wheel rim and tire assembly is coated with a medium to alter the optical characteristics of the vehicle wheel rim and tire assembly surface, and the steps of acquiring an image and analyzing the acquired image are repeated.

An alternate method of the present invention for the operation of a vehicle wheel service system configured to illuminate a surface of a vehicle wheel rim and tire assembly includes the steps of mounting a vehicle wheel rim and tire assembly onto the vehicle wheel service system, illuminating a surface of the vehicle wheel rim and tire assembly, and acquiring an image of the illuminated surface. The acquired image is analyzed, and responsive to the acquired image lacking a predetermined feature having sufficient detectable optical characteristics, the surface of the vehicle wheel rim and tire assembly is automatically coated with a medium to alter the optical characteristics of the vehicle wheel rim and tire assembly surface, and the steps of acquiring an image and analyzing the acquired image are repeated.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

The methods of the present invention may be utilized with a wide range of known vehicle wheel service systems, such as vehicle wheel balancers and vehicle tire changers, which utilize a light source to illuminate a surface of a wheel rim and tire assembly during a wheel service procedure. While a method of the present invention is described herein in the context of a vehicle wheel balancer application, it will be recognized that the method is not limited to a wheel balancer application. For example, methods of the present invention may be utilized on a tire changer system configured to illuminate a surface of a wheel rim for purposes of rotational alignment of a tire with the wheel rim during a tire mounting procedure.

Figure 1:
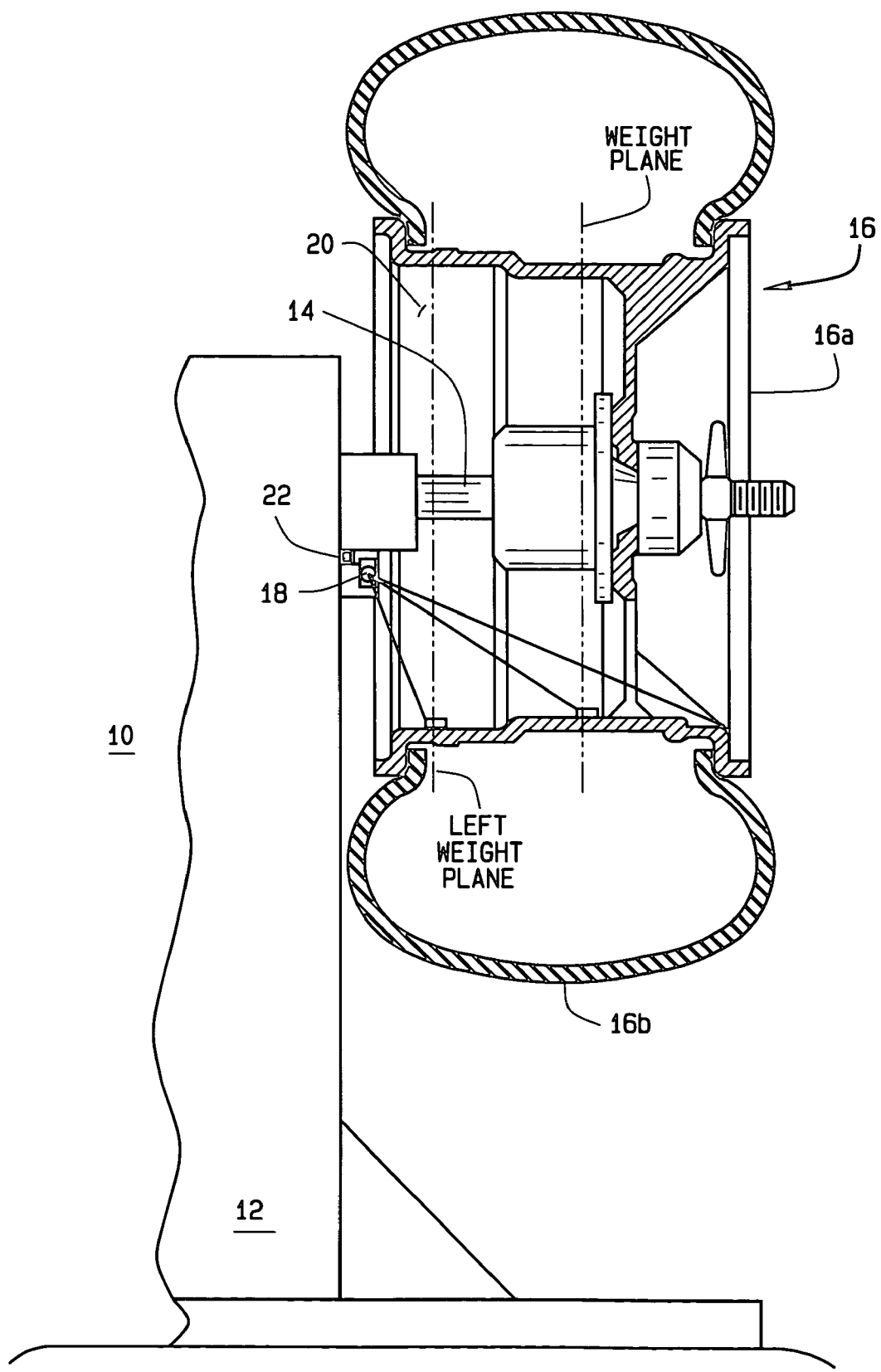
FIG. 1 is a partial sectional view of a vehicle wheel rim and tire assembly mounted onto a vehicle wheel balancer system for use with the method of the present invention.

In general, a vehicle wheel balancer system 10 such as shown in FIG. 1 includes a housing 12, supporting a rotating mounting shaft 14, upon which a vehicle wheel rim and tire assembly 16 undergoing an imbalance measurement procedure is removably mounted. The wheel rim and tire assembly may consist of just a wheel rim 16a, or may include a tire 16b mounted to the wheel rim 16a. The vehicle wheel balancer system 10 includes a microprocessor or similar logic circuit (not shown) having sufficient computational capacity to carry out the necessary functions of the vehicle wheel balancer system 10, and a set of sensors (not shown) operatively coupled to the microprocessor to provide signals representative of imbalances in the vehicle wheel rim and tire assembly 16. The vehicle wheel balancer system 10 further includes a projection system 18 adapted to illuminate a surface 20 of the vehicle wheel rim and tire assembly 16, such as to project a feature onto the surface 20 following mounting of the vehicle wheel rim and tire assembly 16 upon the rotating mounting shaft 14. Known projection systems 18 include those utilizing a laser emitter to project a beam of light which forms a feature, such as a dot, a pattern, or an image on the surface of the vehicle wheel rim and tire assembly 16.

Optionally, the vehicle wheel balancer system 10 may include an known optical sensor 22, either incorporated with, or separate from, the projection system 18, and which is configured to acquire one or more images or optical measurements of features illuminated on the surface 20, from which the microprocessor is configured to determine one or more characteristics of the vehicle wheel rim and tire assembly 16, such as dimensions, runout measurements, or surface characteristics.

Figure 2:
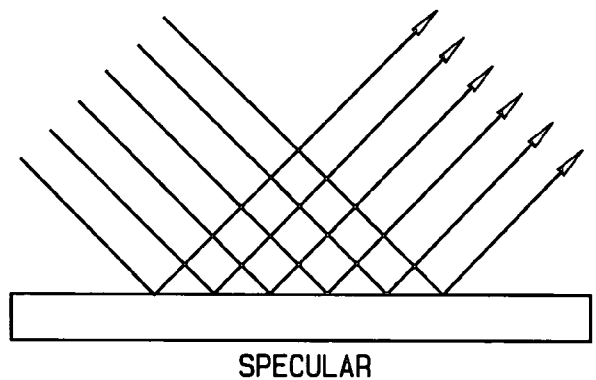
FIG. 2 is an illustration of specular reflection of incident light upon a surface.
Figure 3:
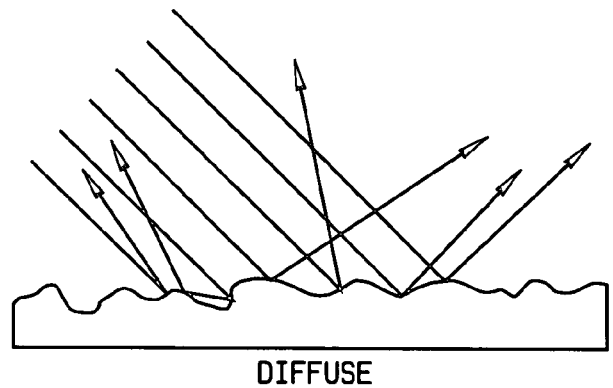
FIG. 3 is an illustration of diffuse reflection of incident light upon a surface.

The optical characteristics of vehicle wheel rim and tire assembly surfaces 20 are known to vary widely. These surface 20, and the vehicle wheel rim inner surface in particularly, may be manufactured from a first extreme with an optically "flat" paint or finish having a high degree of diffuse reflection, such as shown in FIG. 2, to an opposite extreme with a polished metallic or chromed finish, having a specular or mirror-like reflective appearance, such as shown in FIG. 3. Illuminating light projected onto a surface having a specular or mirror-like reflective appearance may only form features which are visible with a narrow field of view at an angle of reflection substantially equal to the angle of incidence of the illuminating light, rendering it difficult to identify such features from most viewing angles. In contrast, illuminating light projected onto a surface having an optically "flat" or diffuse reflective appearance will form features which are visible from a large field of view, as the illuminating light is reflected in almost all directions.

A preferred method of the present invention is utilized to provide vehicle wheel rim and tire assemblies 16 mounted on the vehicle wheel balancer system 10 with a surface 20 having an optical characteristic which provides at least a minimum degree of diffuse reflection of incident light, thereby enabling features formed from, or illuminated by, the illuminating light projected by the projection system 18 to be viewed and identified from a wide range of viewing angles and positions.

Turning to FIG. 2, the initial step in the preferred method is the mounting of the vehicle rim and tire assembly 16 onto the vehicle service system, Box 100, such as to the rotatable mounting shaft 14 of the vehicle wheel balancer system 10. With the wheel rim and tire assembly 16 secured to the mounting shaft 14, at least one imbalance weight placement plane is selected, and the wheel rim and tire assembly 16 is rotated through one or more complete revolutions about a longitudinal axis of the rotatable mounting shaft 14. Measurements representative of imbalance forces generated by the rotating vehicle wheel rim and tire assembly 16 are acquired, Box 102 by the set of sensors, together with corresponding rotational position measurements of the vehicle wheel rim and tire assembly, whereby the microprocessor is provided with data representative of the magnitude and angular direction of the imbalance forces.

Utilizing the acquired imbalance force measurements, corresponding rotational position measurements, and the selected imbalance weight placement planes, an angular position at which an imbalance correction weight is to be placed on the surface of the wheel rim and tire assembly 16, in relation to each selected imbalance weight placement plane to balance the vehicle wheel rim and tire assembly 16, is determined by the microprocessor, Box 104. To aid an operator in the placement of an imbalance correction weight at the determined placement position, the angular position of the determined placement position in relation to a corresponding selected imbalance weight placement plane is indicated with an indication, Box 106, preferably in the form of a illuminated indicia projected onto the surface 20 of the vehicle wheel rim and tire assembly 16. The illuminated indicia may be a simple laser dot, projected point of light, or other indicia representative of the imbalance correction weight placement location.

To reduce or eliminate problems of specular reflection associated with highly polished or chromed surfaces on vehicle wheel rim and tire assemblies, prior to the step of indicating the angular position of the determined placement position in relation to the corresponding selected imbalance weight placement plane with an indication, Box 106, the optical characteristics of the surface 20 of the wheel rim and tire assembly 16 are altered by the application of a medium, Box 108, to provide a minimum level of diffuse reflection whereby the illuminated indicia is visible on the surface 20 of the wheel rim and tire assembly 16 to an operator from a wide range of viewing angles.

In alternate applications, the medium is applied to the surface 20 of the wheel rim to provide an indicia or feature on the surface 20 having optical characteristics which differ from those of the surface 20, and which are visible to either an operator or an optical sensor 22.

Suitable mediums for altering the optical characteristics of a surface include optical "dulling" or "flat" sprays which may be applied to the surface of the wheel rim and tire assembly 16, waxes or polishes which form an opaque or "cloudy" film prior to removal by a rubbing, wiping, or buffing process, or the condensation of water vapor onto the surface 20 of the wheel rim and tire assembly. Those of ordinary skill in the art will recognize that other mediums which alter the optical characters of the surface 20 of the wheel rim and tire assembly 16 may be utilized, provided that they do not have a significant impact upon the imbalance of the vehicle wheel rim and tire assembly 16, are optionally removable, and do not damage the surface 20. For example, an optically altering medium may be applied which has fluorescent optical properties, rendering the surface suitably visible to the observer or optical sensor. Similarly, an optically altering medium which is substantially invisible or transparent to a human observer, but which is either visible to a sensor or rendered visible to a sensor or human observer by illumination may be utilized.

Those of ordinary skill in the art will recognize that once the illuminated indicia is identified on the surface 20 of the wheel rim and tire assembly by the operator, it may be necessary to remove the optically altering medium from a portion of the surface 20 to facilitate attachment of some types of imbalance correction weights. Optionally, any remaining optically altering medium is removed, Box 110, from the surface 20 of the wheel rim and tire assembly 16 upon completion of the wheel service procedure.

Turning to FIG. 3, an alternate method of the present invention, suitable for vehicle wheel service systems which incorporate an optical sensor 22 to acquire one or more images or measurements from features on an illuminated surface 20 of a vehicle wheel rim and tire assembly 16 after the wheel rim and tire assembly 16 is initially mounted to the vehicle wheel service system, Box 200. These measurements may include measurements of lateral runout, radial runout, eccentricity, radial or axial dimensions, axial dimension, tire inflation, tire irregularities, or tire stiffness of the vehicle wheel rim and tire assembly 16.

Prior to illuminating a surface 20 of the vehicle wheel rim and tire assembly 16, Box 204, the optical reflectance characteristics of the surface 20 of the wheel rim and tire assembly 16 are altered by the application of a medium, Box 202 to provide a minimum level of diffuse reflection, whereby the optical sensor 22 is able to acquire one or more images or measurements from the optically altered illuminated surface, to identify features thereon, Box 206. Optionally, the optically altering medium is removed, Box 208, from the surface 20 of the wheel rim and tire assembly 16 upon completion of the wheel service procedure.

For example, by carrying out the step of applying the optically altering medium to the surface 20 of the vehicle wheel rim and tire assembly 16, one or more locations on the wheel rim may be sensed using light reflected from the illuminated surface of the wheel rim and tire assembly 16 to the optical sensor 22. Alternatively, one or more wheel rim radius measurements, one or more wheel rim runout measurements, or the selection of one or more imbalance correction weight placement planes may be carried out with the aid of one or more laser spots, lines, or illuminated patterns rendered visible to the optical sensor 22 on the optically altered surface 20 of the wheel rim and tire assembly 16, in the same manner as is known in the art for carrying out such steps with wheel rim and tire assemblies which do not have highly polished or chrome finished surfaces.

In a wheel balancer application, measurements of the imbalance of the wheel rim and tire assembly 16, and determination of associated imbalance correction weight sized and placement locations may be carried out independently of the optical imaging or measurements, or in conjunction therewith, depending upon the particular manner of operation of the vehicle wheel balancer system 10.

Figure 4:
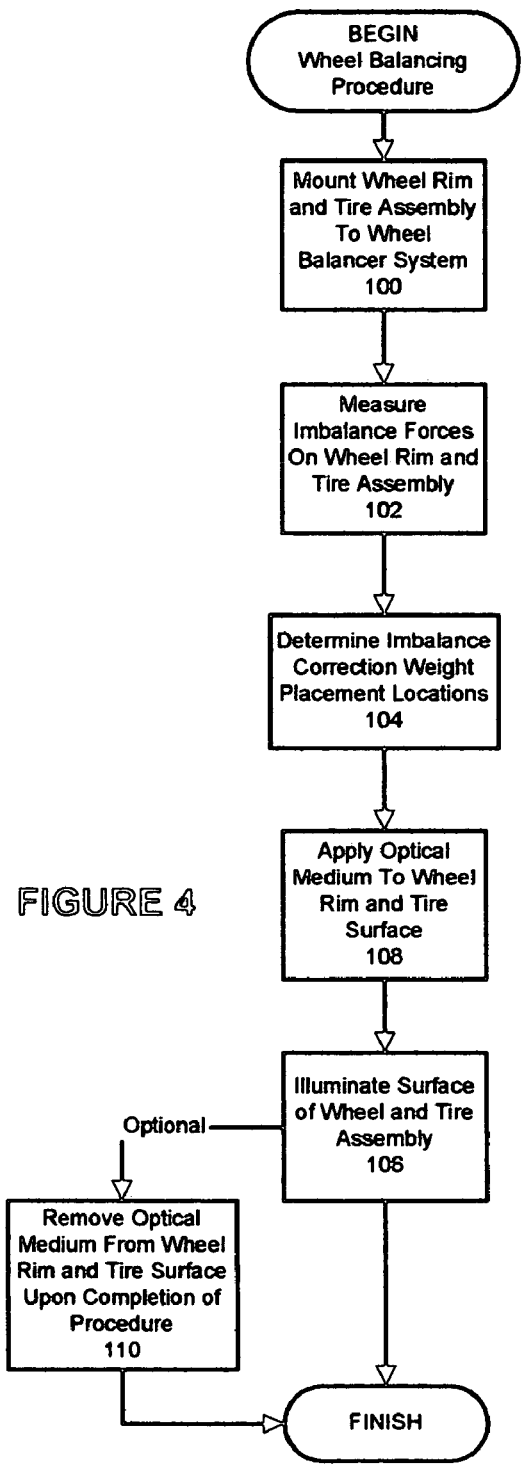
FIG. 4 is a flow chart illustrating the steps of a method of the present invention.
Figure 5:
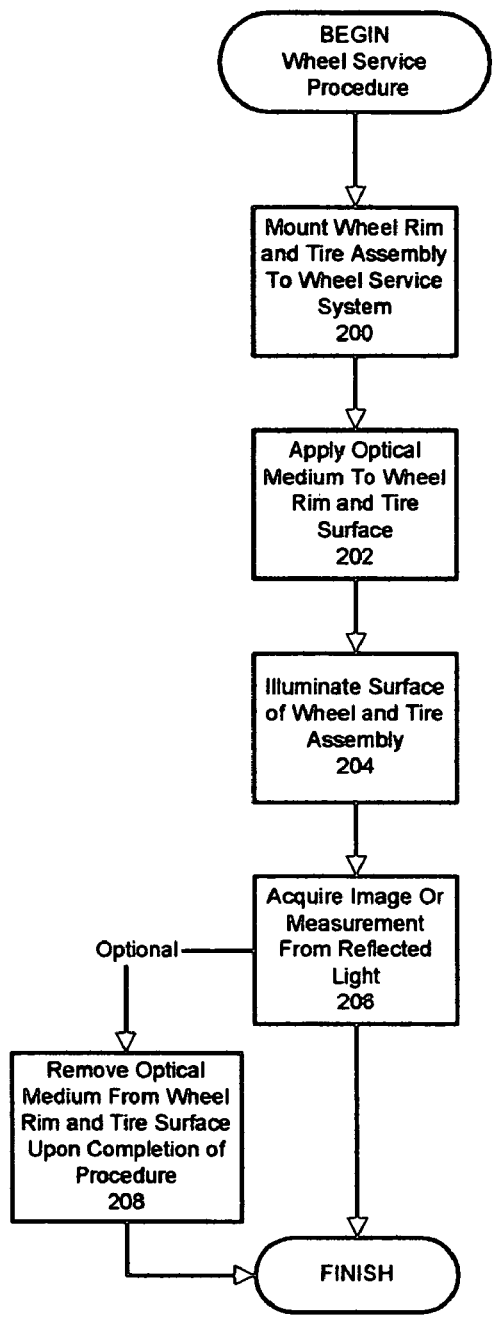
FIG. 5 is a flow chart illustrating the steps of an alternate method of the present invention.
Figure 6:
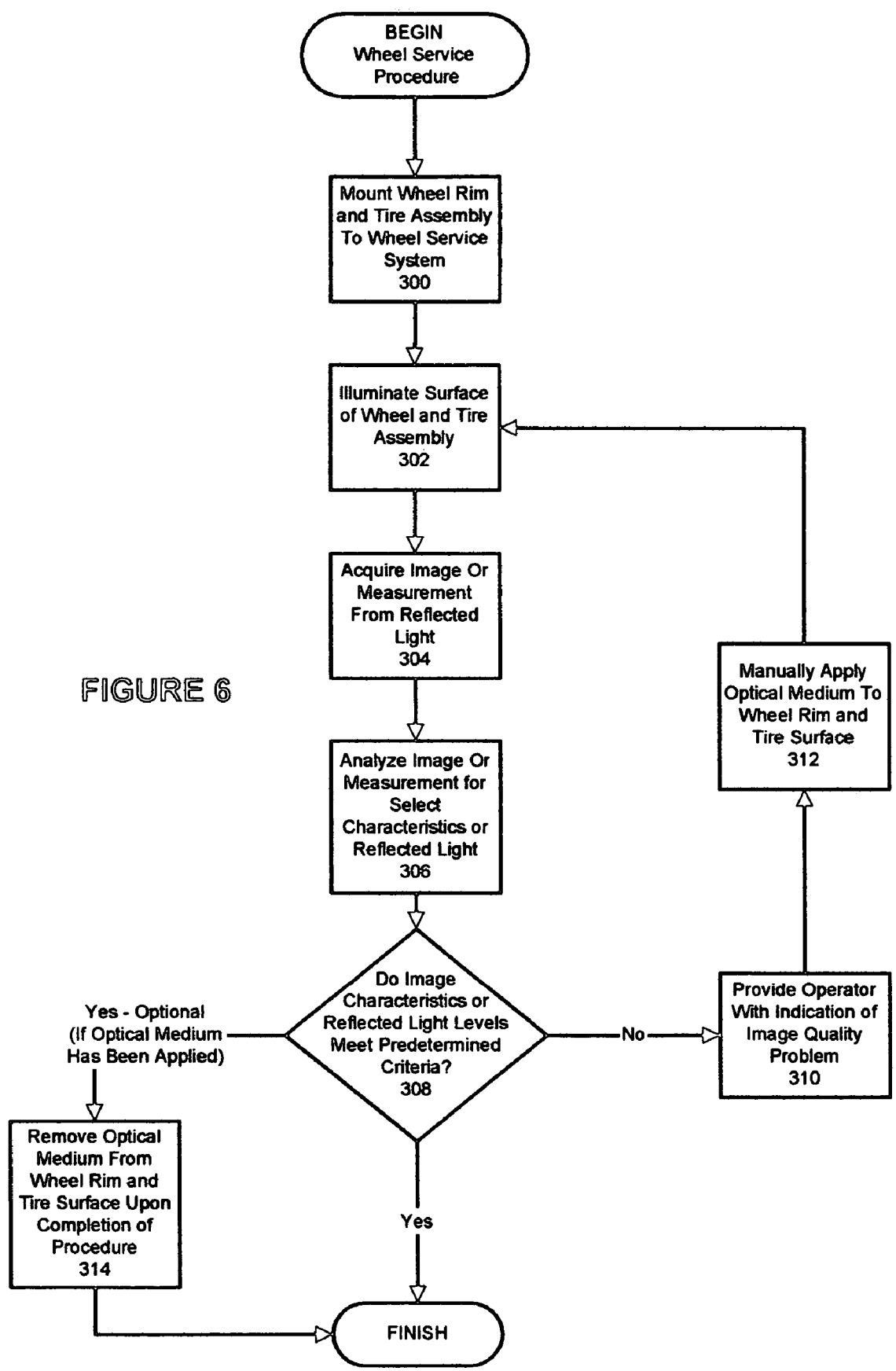
FIG. 6 is a flow chart illustrating the steps of a second alternate method of the present invention.

In an alternate method of the present invention, shown in FIG. 4, suitable for vehicle wheel service systems which incorporate an optical sensor 22, the wheel rim and tire assembly 16 is initially mounted to the vehicle wheel service system, Box 300, and illuminated as previously described, Box 302, one or more images or measurements are acquired from the illuminated surface 20 of a vehicle wheel rim and tire assembly 16 by the optical sensor 22, Box 304.

The images or measurements are analyzed Box 306, to determine if one or more characteristics meet predetermined criteria, or if sufficient emitted or reflected light is detected from the illuminated surface 20 of the vehicle wheel rim and tire assembly 16 by the optical sensor 22 for the intended purpose of acquiring an image or measurement, Box 308. If an insufficient level of emitted or reflected light is detected from the surface 20 of the vehicle wheel rim and tire assembly 16, or the selected characteristics do not meet the predetermined criteria, an indication is provided to an operator, Box 310 whereby an optical characteristic of the surface 20 of the vehicle wheel rim and tire assembly 16 may be altered by the application of an optically altering medium, Box 312, as previously described.

The process of acquiring and analyzing an image or measurement of the illuminated surface with the optical sensor 22 is then repeated after the application of the optically altering medium to determine if the selected characteristics meet the predetermined criteria, or if sufficient emitted or reflected light is detected from the optically altered surface for the intended purpose of acquiring an image or measurement. Optionally, the optically altering medium is removed, Box 314, from the surface 20 of the wheel rim and tire assembly 16 upon completion of the wheel service procedure.

Figure 7:
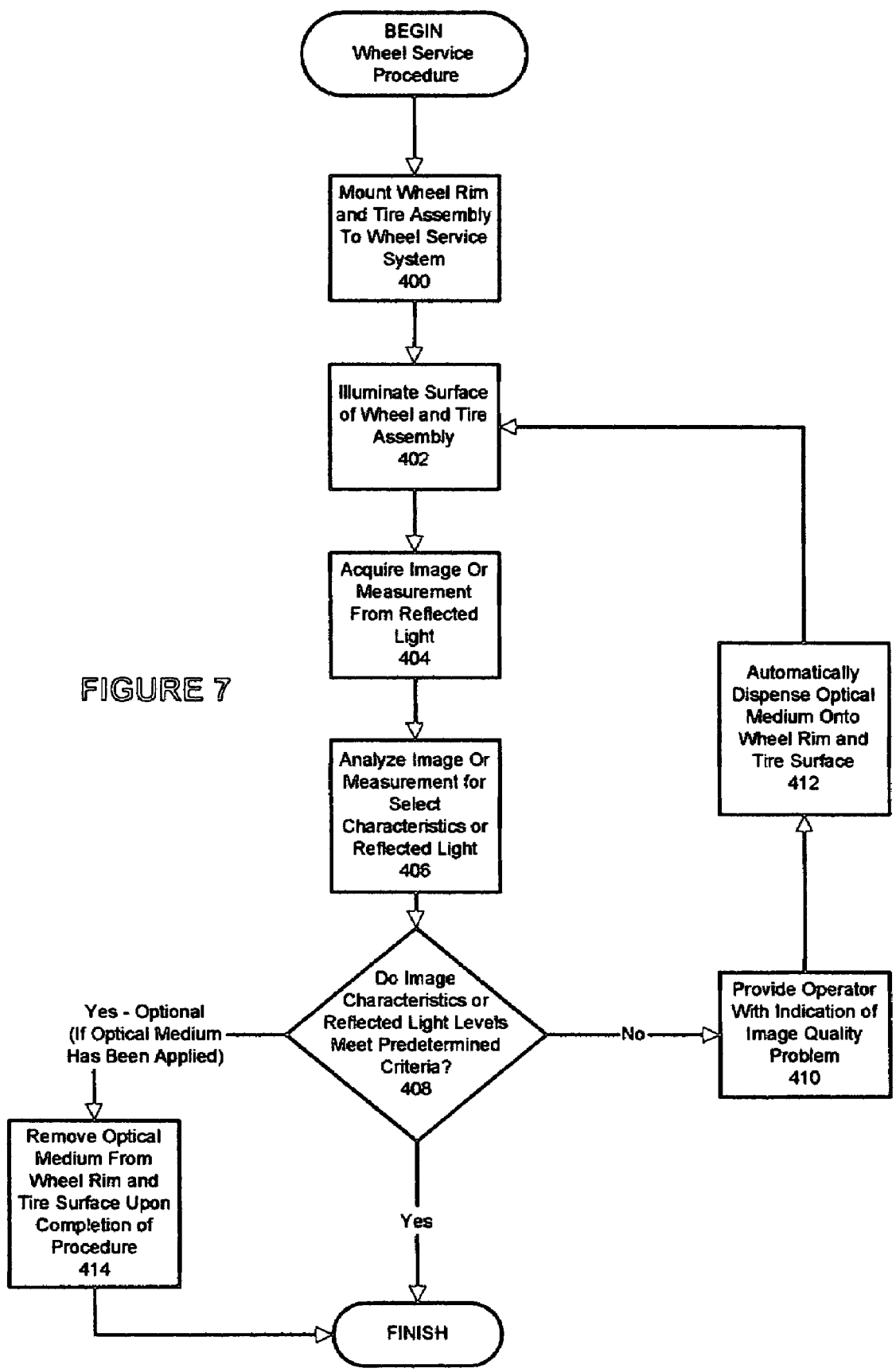
FIG. 7 is a flow chart illustrating the steps of a third alternate method of the present invention.

In an alternate method of the present invention, shown in FIG. 7, suitable for vehicle wheel service systems which incorporate an optical sensor 22, the wheel rim and tire assembly 16 is initially mounted to the vehicle wheel service system, Box 400. A surface 20 of the vehicle wheel rim and tire assembly 16 is illuminated, Box 402, and one or more images or measurements are acquired from an illuminated surface 20 of a vehicle wheel rim and tire assembly 16 by the optical sensor 22, Box 404. The images or measurements are analyzed Box 406, to determine if one or more characteristics meet predetermined criteria, or if sufficient emitted or reflected light is detected from the illuminated surface 20 of the vehicle wheel rim and tire assembly by the optical sensor 22 for the intended purpose of acquiring an image or measurement, Box 408.

If an insufficient level of emitted or reflected light is detected from the illuminated surface 20 of the vehicle wheel rim and tire assembly 16, an indication is provided to an operator, Box 410, and an optical characteristic of the surface 20 of the vehicle wheel rim and tire assembly 16 is altered by an automated application of a optically altering medium, Box 412.

Figure 8:
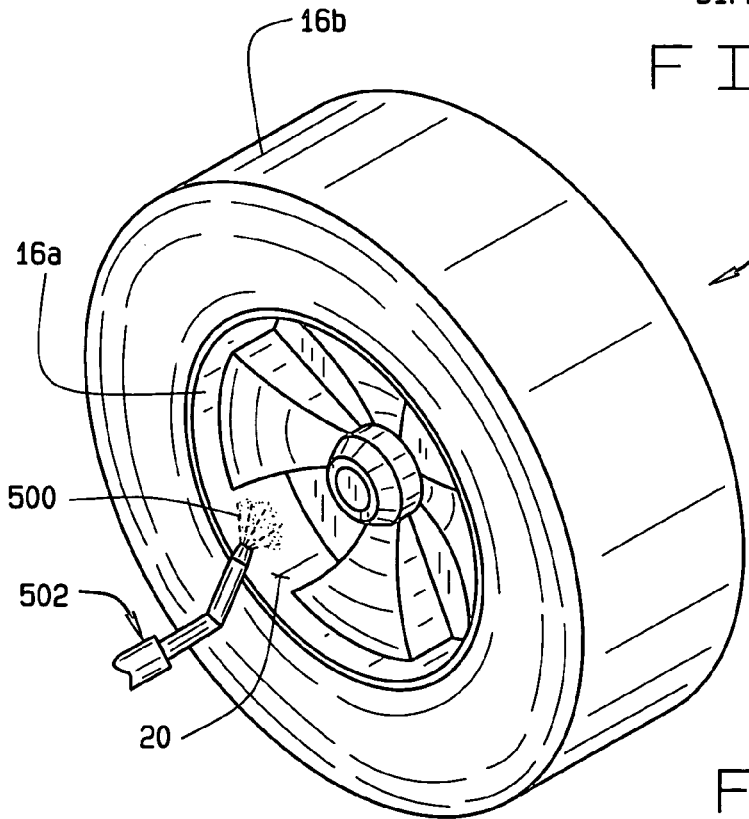
FIG. 8 is a perspective illustration of an optically altering medium dispenser in operative relationship to a vehicle wheel rim and tire assembly.

As illustrated in FIG. 8, the automated application of the optically altering medium, Box 412, is preferably in the form of a spray 500 dispensed from a suitable dispensing system 502 disposed in proximity to the surface 20 of the vehicle wheel rim and tire assembly 16, however, it will be recognized that other methods for automated application of the optically altering medium onto the surface 20 of the wheel rim and tire assembly 16 may be utilized.

Returning to FIG. 7, the steps of illuminating the surface 20, Box 402 acquiring an image, Box 404, and analyzing the image or measurement of the illuminated surface with the optical sensor 22, Box 406, are then repeated to determine if a sufficient emitted or reflected light is detected from the optically altered illuminated surface for the intended purpose of acquiring an image or measurement, Box 408. Optionally, the optically altering medium is removed, Box 414, from the surface 20 of the wheel rim and tire assembly 16 upon completion of the wheel service procedure.

Those of ordinary skill in the art will recognize that the methods of the present invention are not limited to use on vehicle wheel rim and tire assemblies 16 having highly polished, chrome finished, or reflective surfaces 20, but may be utilized to facilitate the steps of illuminating a surface 20 in a visible manner on any wheel rim and tire assembly 16 wherein the optical features of the surface render reflection of incident light difficult for an operator to identify, or the surface optical characteristics reduce the level of reflected light received by an optical sensor 22 below a predetermined threshold, such that increasing the degree of diffuse reflection will enhance the visibility or level of reflected light visible to an operator or optical sensor 22. For example, methods of the present invention may be utilized to apply an optically altering medium to increase the reflective optical characteristics of a wheel rim and tire assembly 16 having surfaces 20 with low reflective or light absorbing characteristics.

The present invention can be embodied in part the form of computer-implemented processes and apparatuses for practicing those processes. The present invention can also be embodied in part in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A method for illuminating a surface of a vehicle wheel rim and tire assembly during a vehicle wheel service procedure, the method comprising:
   mounting the vehicle wheel rim and tire assembly on a vehicle wheel service system such that a wheel service procedure can be carried out;
   applying an optically altering medium to a surface of the vehicle wheel rim and tire assembly, said optically altering medium selected to alter an optical characteristic of said surface; and
   illuminating said surface of the vehicle wheel rim and tire assembly with a light source.

2. The method of claim 1 wherein said optically altering medium establishes a feature on said surface.

3. The method of claim 1 further including the step of receiving light from said illuminated surface at an optical receiver associated with said vehicle wheel servicing system.

4. The method of claim 3 further including the step of obtaining at least one measurement of a characteristic of the vehicle wheel rim and tire assembly from said received light.

5. The method of claim 1 wherein the step of applying said optically altering medium includes automatically dispensing said optically altering medium onto said surface.

6. The method of claim 1 wherein the step of applying said optically altering medium includes spraying an optically altering medium onto said surface.

7. The method of claim 1 further including the step of removing said optically altering medium from said surface of the vehicle wheel rim and tire assembly.

8. The method of claim 1 wherein said optically altering medium establishes at least a minimum level of diffuse reflection from said surface.

9. The method of claim 1 wherein said optically altering medium reduces specular reflection from said surface.

10. The method of claim 1 wherein said optically altering medium is a fluorescent material.

11. The method of claim 1 wherein said optically altering medium is substantially invisible.

12. The method of claim 11 wherein said step of illuminating said surface of the vehicle wheel rim and tire assembly renders said optically altering medium visible.

13. The method of claim 1 wherein said optically altering medium is transparent to visible light.

14. The method of claim 1 wherein said step of illuminating said surface includes projecting a laser beam onto said surface of the vehicle wheel rim and tire assembly, and wherein said laser light reflecting from said surface establishes a feature on said surface.

15. The method of claim 1 wherein said step of illuminating said surface includes projecting a feature onto said surface of the vehicle wheel rim and tire assembly.

16. The method of claim 15 wherein said step of illuminating includes projecting said feature onto said surface at a location associated with the placement of an imbalance correction weight.

17. The method of claim 1 wherein said vehicle wheel service system is a vehicle wheel balancer.

18. The method of claim 17 wherein said vehicle wheel service procedure is a vehicle wheel imbalance correction procedure.

19. The method of claim 1 wherein said vehicle wheel service system is a tire changer system.

20. The method of claim 19 wherein said vehicle wheel service procedure is a tire mounting procedure.

21. The method of claim 1 wherein said optically altering medium is a removable optically altering medium.

22. A method for illuminating a surface of a vehicle wheel rim and tire assembly undergoing a vehicle wheel service procedure, the method comprising:
   mounting the vehicle wheel rim and tire assembly on a vehicle wheel service system such that a wheel service procedure can be carried out;
   illuminating said surface of the vehicle wheel rim and tire assembly with a light source;
   observing said illuminated surface to identify a feature on said surface;
   responsive to an observed characteristic of said illuminated surface, applying an optically altering medium to said surface of the vehicle wheel rim and tire assembly, said optically altering medium selected to alter an optical characteristic of said surface; and
   repeating the step of observing said illuminated surface to identify said feature.

23. The method of claim 22 further including the step of obtaining at least one measurement of a characteristic of the vehicle wheel rim and tire assembly from said identified feature on said illuminated surface.

24. The method of claim 22 wherein said step of illuminating said surface includes projecting a laser beam onto said surface of the vehicle wheel rim and tire assembly, and wherein said feature is defined by an intersection of said laser beam and said surface.

25. The method of claim 22 wherein said step of illuminating said surface includes projecting a feature onto said surface of the vehicle wheel rim and tire assembly.

26. The method of claim 25 wherein said step of illuminating said surface includes projecting a feature onto said surface at a location associated with the placement of an imbalance correction weight.

27. The method of claim 22 wherein the step of applying an optically altering medium to a surface of the vehicle wheel rim and tire assembly includes automatically dispensing said optically altering medium onto said surface.

28. The method of claim 22 wherein said vehicle wheel service system is a vehicle wheel balancer.

29. The method of claim 22 wherein said vehicle wheel service system is a tire changer system.

30. The method of claim 22 wherein said observed characteristic is reflectance.

31. The method of claim 22 further including the step of removing said optically altering medium from said surface.

32. A method for illuminating a surface of a vehicle wheel rim and tire assembly undergoing a vehicle wheel service procedure, the method comprising:
   mounting the vehicle wheel rim and tire assembly on a vehicle wheel service system such that a wheel service procedure can be carried out;
   illuminating said surface of the vehicle wheel rim and tire assembly with a light source;
   observing said illuminated surface to measure at least one characteristic of a feature on said surface;
   responsive to said observation of said illuminated surface, automatically dispensing an optically altering medium onto said surface of the vehicle wheel rim and tire assembly, said optically altering medium selected to alter an optical characteristic of said surface; and
   repeating the step of observing said illuminated surface to measure said at least one characteristic.

33. The method of claim 32 wherein the step of automatically dispensing an optically altering medium is responsive to said measure of said at least one characteristic being below a predetermined threshold.

34. The method of claim 33 wherein said at least one characteristic is diffuse reflectance.

35. The method of claim 32 wherein said vehicle wheel service system is a vehicle wheel balancer.

36. The method of claim 32 wherein said vehicle wheel service system is a tire changer system.

37. The method of claim 32 further including the step of removing said optically altering medium from said surface.

38. The method of claim 32 wherein said step of illuminating said surface includes projecting said feature onto said surface of the vehicle wheel rim and tire assembly.

* * * * *